(12) United States Patent
Sloan

(10) Patent No.: US 9,254,019 B2
(45) Date of Patent: Feb. 9, 2016

(54) SHOELACE TYING DEVICES AND METHODS

(71) Applicant: Eileen Sloan, Evergreen, CO (US)

(72) Inventor: Eileen Sloan, Evergreen, CO (US)

( * ) Notice: Subject to any disclaimer, the term of this patent is extended or adjusted under 35 U.S.C. 154(b) by 133 days.

(21) Appl. No.: 14/148,458

(22) Filed: Jan. 6, 2014

(65) Prior Publication Data

US 2014/0115842 A1 May 1, 2014

Related U.S. Application Data

(63) Continuation-in-part of application No. 12/883,274, filed on Sep. 16, 2010, now abandoned.

(60) Provisional application No. 61/260,750, filed on Nov. 12, 2009.

(51) Int. Cl.
| | |
|---|---|
| *A43C 19/00* | (2006.01) |
| *A43B 3/00* | (2006.01) |
| *A43C 1/00* | (2006.01) |
| *A43C 7/00* | (2006.01) |
| *G09B 19/00* | (2006.01) |
| *G09F 3/00* | (2006.01) |

(52) U.S. Cl.
CPC ............. *A43C 19/00* (2013.01); *A43B 3/0052* (2013.01); *A43C 1/00* (2013.01); *A43C 7/00* (2013.01); *G09B 19/0076* (2013.01); *G09F 3/00* (2013.01); *Y10T 24/3705* (2015.01)

(58) Field of Classification Search
CPC ............ A43C 19/00; A43C 1/00; A43C 7/00; A43B 3/0052; G09B 19/0076; Y10T 24/3705
USPC .......................................................... 434/260
See application file for complete search history.

(56) References Cited

U.S. PATENT DOCUMENTS

| | | | | | |
|---|---|---|---|---|---|
| 686,477 | A | * | 11/1901 | Priddat ................. | B65D 63/14 24/130 |
| 1,350,860 | A | * | 8/1920 | Ersted ................... | B65D 63/14 24/129 B |
| 1,806,162 | A | * | 5/1931 | Hahn ..................... | A43C 7/04 24/129 B |
| 2,313,874 | A | * | 3/1943 | Hume .................... | A43C 1/00 434/260 |
| 2,385,197 | A | * | 9/1945 | Eisel .................... | G09B 25/00 242/388.1 |
| 2,527,242 | A | * | 10/1950 | Clark ........................... | 434/260 |
| 2,650,399 | A | * | 9/1953 | Torelli ................... | A43C 7/00 24/712.2 |
| 2,907,586 | A | * | 10/1959 | Paxton ................. | G09F 3/0297 211/50 |
| 3,296,669 | A | * | 1/1967 | Elder, Jr. ............... | A43C 7/00 24/129 R |
| 3,357,070 | A | * | 12/1967 | Soloan ....................... | 24/30.5 S |
| 3,682,180 | A | * | 8/1972 | McFarlane ............ | A61M 25/02 128/DIG. 26 |

(Continued)

*Primary Examiner* — Robert J Sandy
*Assistant Examiner* — Louis Mercado
(74) *Attorney, Agent, or Firm* — Kilpatrick Townsend & Stockton LLP

(57) ABSTRACT

A device for tying a shoelace includes a planar-shaped body member including a first opening, a second opening, a third opening, and a fourth opening. Each of the openings is configured to allow the shoelace to be inserted there through. The first, second, third and fourth openings may be arranged in a two-by-two array, wherein the first and second openings form a first row of the array, and wherein the third and fourth openings form a second row of the array. The first and fourth openings may be coupled to one another by a first slit, and the second and third openings may be coupled to one another by a second slit.

19 Claims, 18 Drawing Sheets

(56) References Cited

U.S. PATENT DOCUMENTS

| | | | | |
|---|---|---|---|---|
| 3,820,200 | A * | 6/1974 | Myers | 24/30.5 S |
| 3,822,441 | A * | 7/1974 | Paxton | B65D 33/1625 24/30.5 S |
| 3,906,642 | A * | 9/1975 | Cohen | A43B 1/0027 36/112 |
| 3,962,757 | A * | 6/1976 | Gedney | A47C 21/022 206/486 |
| 4,017,984 | A * | 4/1977 | Bonfigli | G09B 19/0076 434/260 |
| 4,138,055 | A * | 2/1979 | Harrison | B42D 17/00 232/1 C |
| 4,290,172 | A * | 9/1981 | Burton | A43C 7/00 24/129 R |
| 4,342,557 | A * | 8/1982 | Bandar | G09B 19/0076 289/1.5 |
| 4,357,740 | A * | 11/1982 | Brown | B65D 33/1625 24/30.5 S |
| 4,884,321 | A * | 12/1989 | Holub | A43C 7/00 24/712.2 |
| 4,914,789 | A * | 4/1990 | Pedersen | B65D 33/1625 24/30.5 S |
| 5,065,482 | A * | 11/1991 | Lofy | A43B 1/0072 24/712.1 |
| 5,110,296 | A * | 5/1992 | Cohen | G09B 19/0076 434/260 |
| 5,119,539 | A * | 6/1992 | Curry | A43C 7/00 24/130 |
| 5,381,588 | A * | 1/1995 | Nelson | B65D 73/0064 24/30.5 S |
| 5,718,021 | A * | 2/1998 | Tatum | A43C 7/00 24/712.2 |
| 5,897,323 | A * | 4/1999 | Stanfield | G09B 19/0076 434/260 |
| 5,979,028 | A * | 11/1999 | Hicks | A43B 3/0078 24/130 |
| D445,980 | S * | 7/2001 | Tjugum | D32/61 |
| 6,382,981 | B1 * | 5/2002 | Stanfield | G09B 19/24 434/260 |
| 6,473,944 | B1 * | 11/2002 | Vazin | A43C 7/005 24/129 A |
| 7,677,525 | B2 * | 3/2010 | Sanchez | A01G 9/128 24/30.5 S |
| 2002/0020046 | A1 * | 2/2002 | Voughlohn | A43C 1/00 24/712.1 |
| 2007/0101554 | A1 * | 5/2007 | O'Brien | A42C 5/00 24/129 R |
| 2008/0083134 | A1 * | 4/2008 | Lin | A43C 7/00 35/50.1 |
| 2014/0308641 | A1 * | 10/2014 | Tebben | G09B 19/0076 434/260 |

* cited by examiner

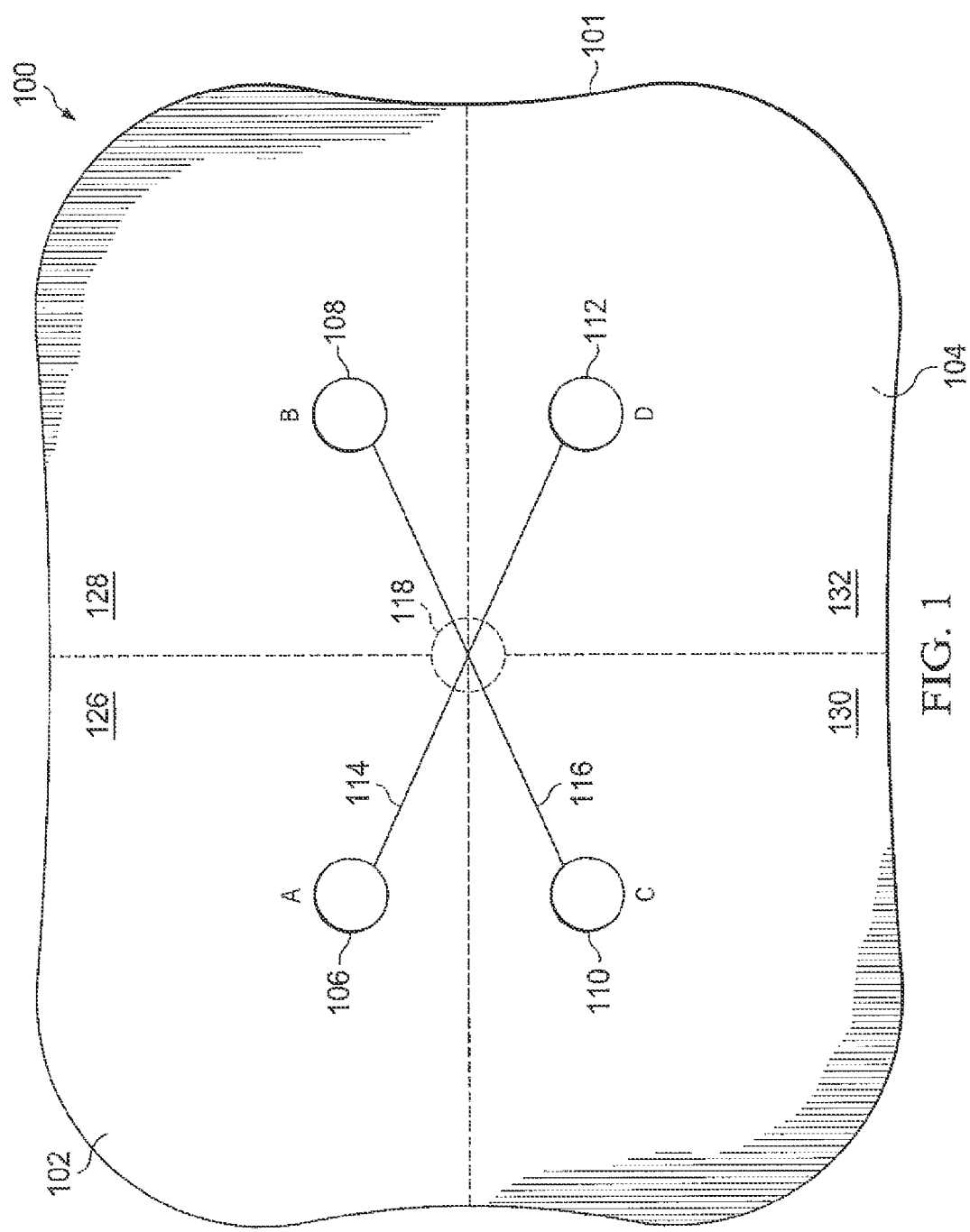

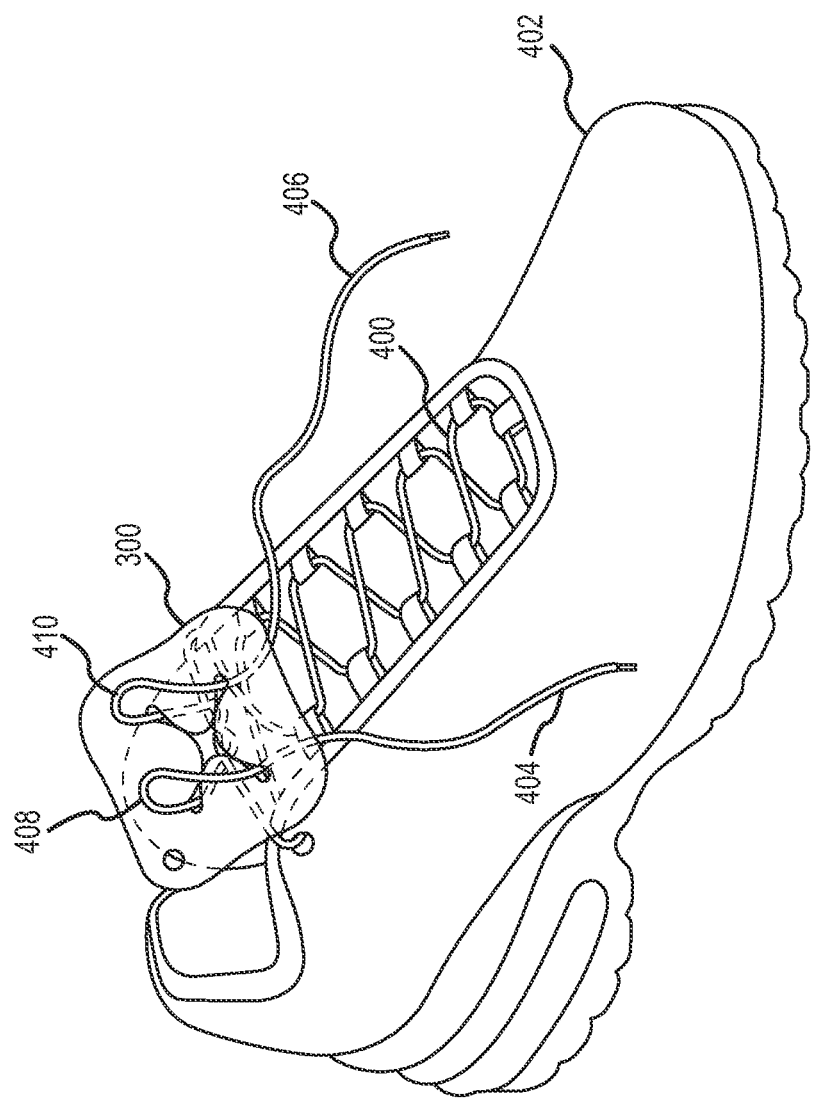

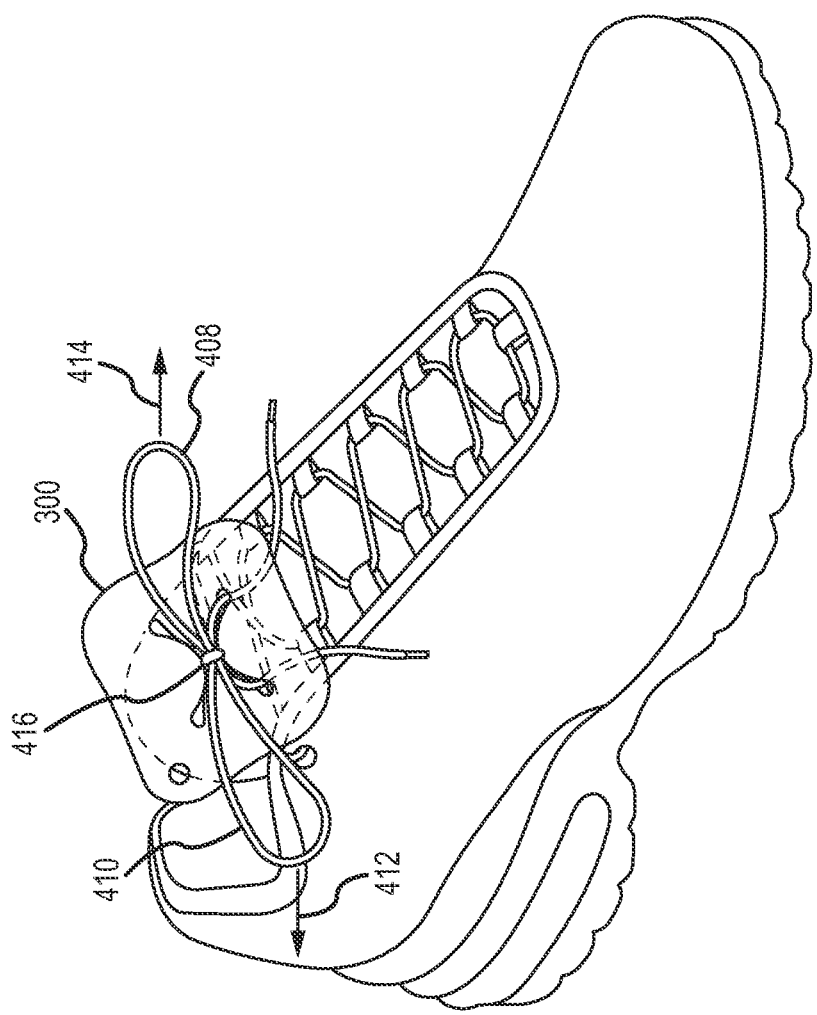

SHOELACE TYING DEVICES AND METHODS

CROSS-REFERENCE TO RELATED APPLICATIONS

This application is a continuation-in-part of U.S. patent application Ser. No. 12/883,274 filed Sep. 16, 2010 and now abandoned, entitled "Shoelace Tying Device," which claims priority to U.S. Provisional Patent Application No. 61/260,750 filed Nov. 12, 2009, entitled "Shoelace Tying Device," the entire disclosures of which are hereby incorporated by reference, for all purposes, as if fully set forth herein.

BACKGROUND OF THE INVENTION

1. Field of the Invention

The invention relates to a device for assisting one in tying a shoelace.

2. Description of the Prior Art

There are many "firsts" in one's life; some more exciting than others. One exciting "first" is when a child learns to tie their shoelace for the first time. Learning how to tie a shoelace is not an easy task. Typically, it takes instruction from an adult in addition to a lot of time and effort on the child's part.

In addition, people with disabilities, such as Parkinson's, arthritis, or other conditions that affect the ability to use one's hands effectively may have trouble tying a shoelace.

Various teaching aids and learning devices have been developed as an aid in teaching or helping to tie shoelaces in certain knots. One such a device is disclosed in U.S. Pat. No. 4,342,557 to Bandar. Bandar discloses a device that can be used to teach young children how to tie a double bow knot. However, not everyone uses the "bunny ear" method of tying shoes.

BRIEF DESCRIPTION OF THE INVENTION

A device for tying a shoelace includes a planar-shaped body member including a first opening, a second opening, a third opening, and a fourth opening. Each of the openings is configured to allow the shoelace to be inserted there through. The first, second, third and fourth openings may be arranged in a two-by-two array, wherein the first and second openings form a first row of the array, and wherein the third and fourth openings form a second row of the array. The first and fourth openings may be coupled to another by a first slit, and the second and third openings may be coupled to one another by a second slit.

BRIEF DESCRIPTION OF THE DRAWINGS

The features of the invention will be better understood by reference to the accompanying drawing in connection with reading the specification in which:

FIG. 1 is a plan view of a shoelace tying device according to one embodiment of the invention;

FIGS. 4A-4E are perspective vies showing the use of the device of either FIG. 1 or FIG. 3 and the steps involved in tying one's shoelace.

DETAILED DESCRIPTION OF THE INVENTION

Figure 2A:
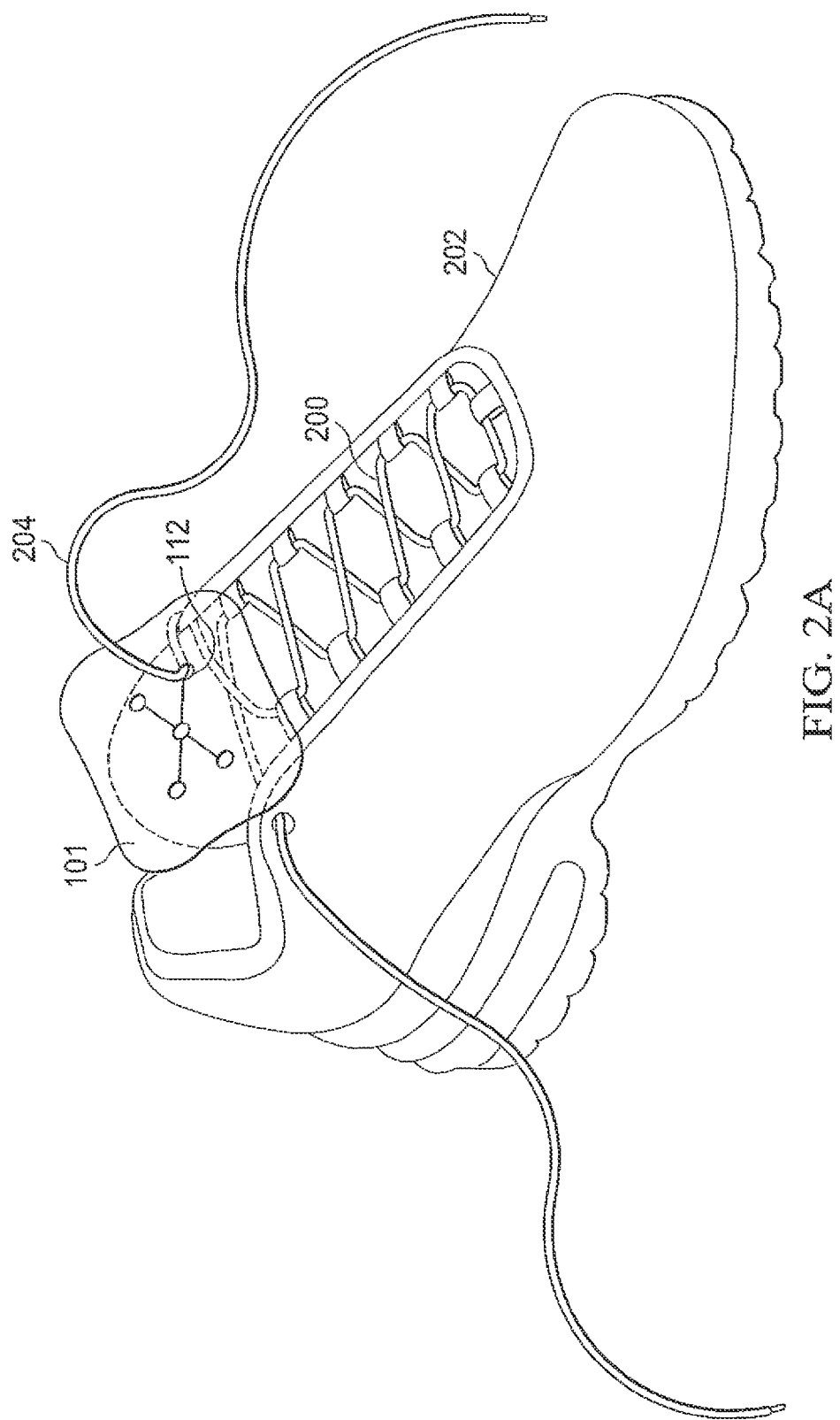
FIGS. 2A-2K are perspective views showing the use of the device of FIG. 1 and the steps involved in tying one's shoelace.

Turning now to the figures, there is disclosed in FIG. 1 a device 100 according to an embodiment of the invention that will be found quite useful in the tying of one's shoelace. In the illustrated embodiment, device 100 includes a body member 101 having a substantially planar upper face 102 and a substantially planar lower face 104. Body member 101 also includes a first opening 106, a second opening 108, a third opening 110, and a fourth opening 112. First opening 106 and fourth opening 112 are coupled to each other via a first slit 114, and second opening 108 and third opening 110 are coupled to each other via a second slit 116.

Body member 101 may be formed from any suitable material, with any suitable thickness, and may have any suitable size and shape. However, in one embodiment, body member 101 is formed from a suitable plastic material with the thickness of about $1/16$", and is generally rectangular-shaped with dimensions about 3 inches by $2\frac{1}{2}$ inches. Although both upper face 102 and lower face 104 are illustrated in FIG. 1 as being substantially planar, in other embodiments, upper face 102 and lower face 104 may be slightly contoured to conform more closely to the upper part of a shoe where the laces generally reside.

Each of the first through fourth openings, 106, 108, 110, and 112, respectively, are illustrated in FIG. 1. as being in the form of a circular hole; however, other suitable shapes are contemplated by the present invention, such as oval, square, rectangular, etc. In addition, first through fourth openings, 106, 108, 110, and 112, respectively, may have any suitable dimensions. For example, in an embodiment in which the openings are circular holes, they may each have a diameter in a range of about $3/16$"-$1/4$", which should be enough to accommodate various size shoelaces.

According to the teachings of the present invention, the configuration of first through fourth openings, 106, 108, 110, and 112, respectively, formed in body member 101 is a two-by two (2×2) array. This array may be a square array, a rectangular array, or may have other suitable array configurations. For example, the rows and columns of the array do not have to be aligned with one another. The configuration could be in the form of any suitable parallelogram, a trapezoid, or other suitable shape. Consequently, the openings may be spaced from one another any suitable distance. For example, in the illustrated embodiment, the openings are in a rectangular 2×2 array in which first and second openings 106, 108, and third and fourth openings 110, 112 are spaced in a range of about $7/8$"-$1\frac{1}{4}$", and first and third openings 106, 110, and second and fourth openings 108, 112, are spaced in a range of about $3/4$"-$1\frac{1}{8}$". It should be noted that the array may reside on any part of body member 101.

In one particular embodiment, body member 101 is "separated" into quadrants 126, 128, 130, 132, as illustrated in FIG. 1 by the use of dashed lines. The quadrants may or may not be of equal surface area. In this embodiment, each quadrant will be associated with one opening. For example, first opening 106 will be associated with first quadrant 126, second opening 108 will be associated with second quadrant 128, third opening 110 will be associated with third quadrant 130, and fourth opening 112 will be associated with fourth quadrant 132.

First and second slits 114, 116, may each have any suitable width and have any suitable configuration; however, in one embodiment, as illustrated in FIG. 1, slits 114, 116 are substantially straight lines having a minimal (e.g., $1/32$") width. First slit 114 extends between first opening 106 and fourth opening 112, and second slit 116 extends between second opening 108 and third opening 110. In one embodiment, there exists an opening 118 at the intersection of 101, to allow body member 101 to be "released" from a shoelace, as described in more detail below.

Also illustrated in FIG. 1 are indicia for the openings to be used with suitable instructions on how to tie a shoelace using device 100. For example, the letter "A" is associated with opening 106, the letter "B" is associated with opening 108, the letter "C" is associated with opening 110, and letter "D" is associated with opening 112.

Figure 2B:
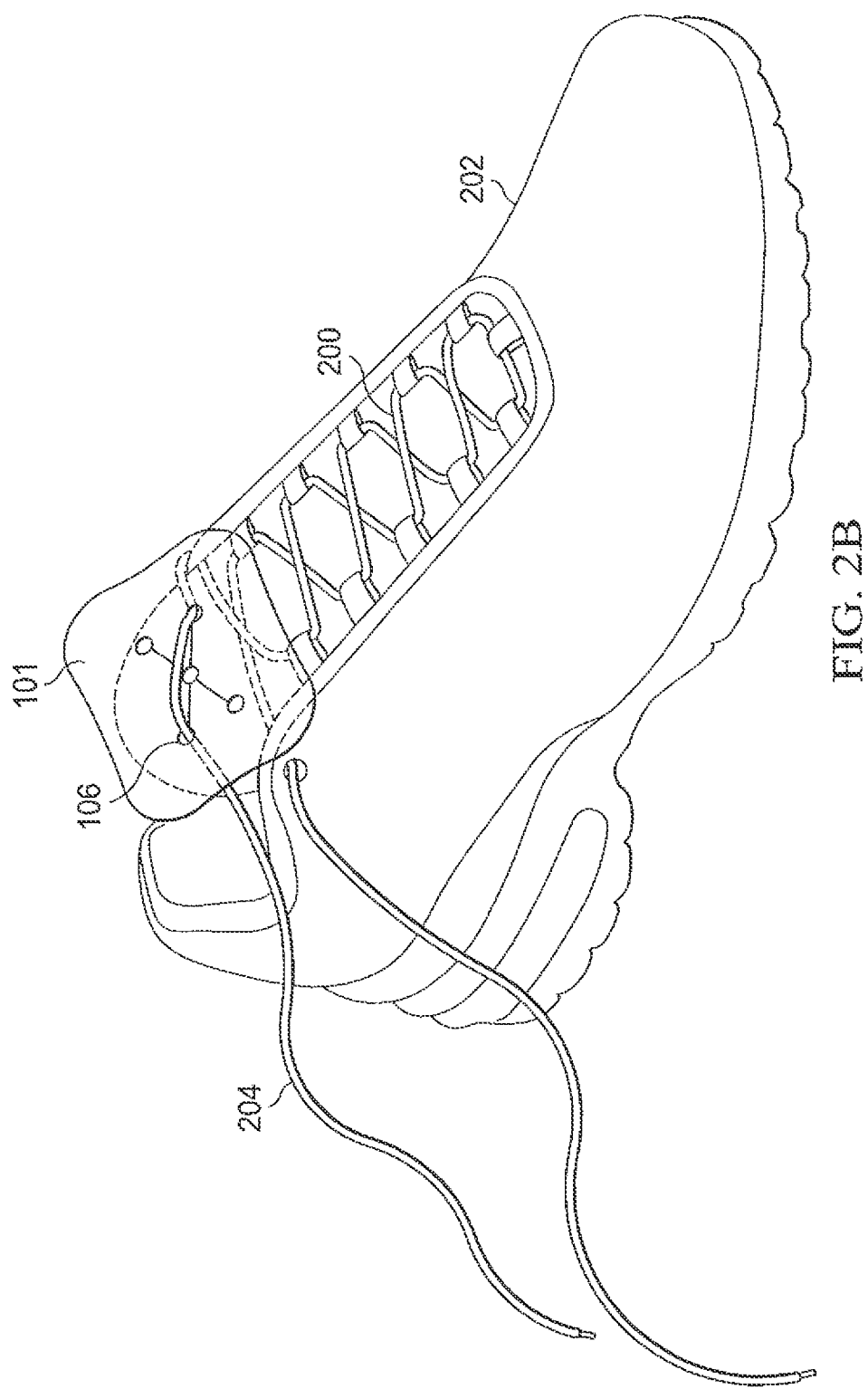

Referring now to FIGS. 2A-2K, a method of using device 100 to tie a shoelace 200 according to one embodiment of the invention is illustrated. In FIG. 2A, body member 101 is placed over the upper part of a shoe 202. The first step is to take a first end 204 of shoelace 200 and insert it through opening 112 starting at lower face 104. The next step, as illustrated in FIG. 2B, is to take first end 204 and insert it through opening 106 starting at upper face 102.

Figure 2C:
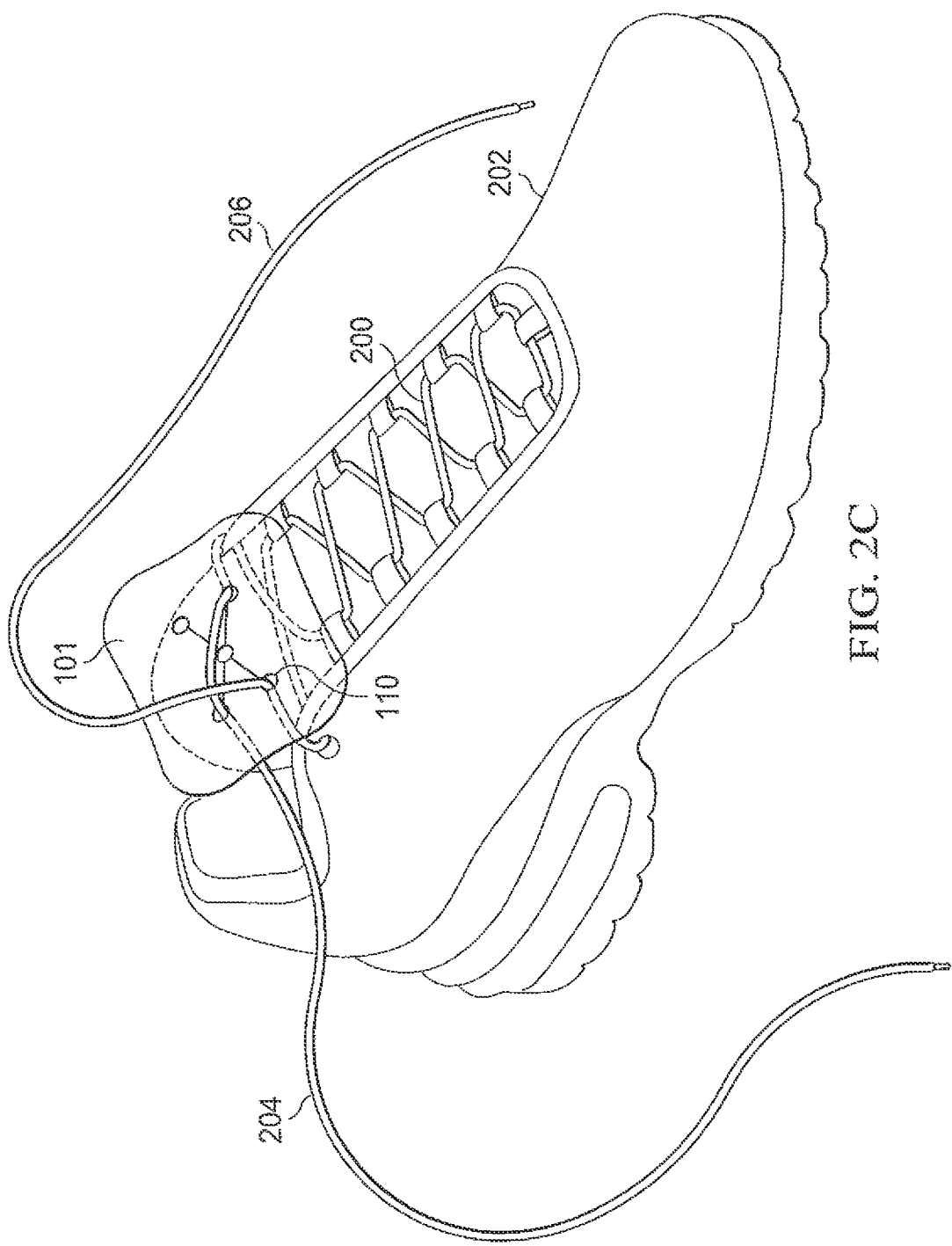
Figure 2D:
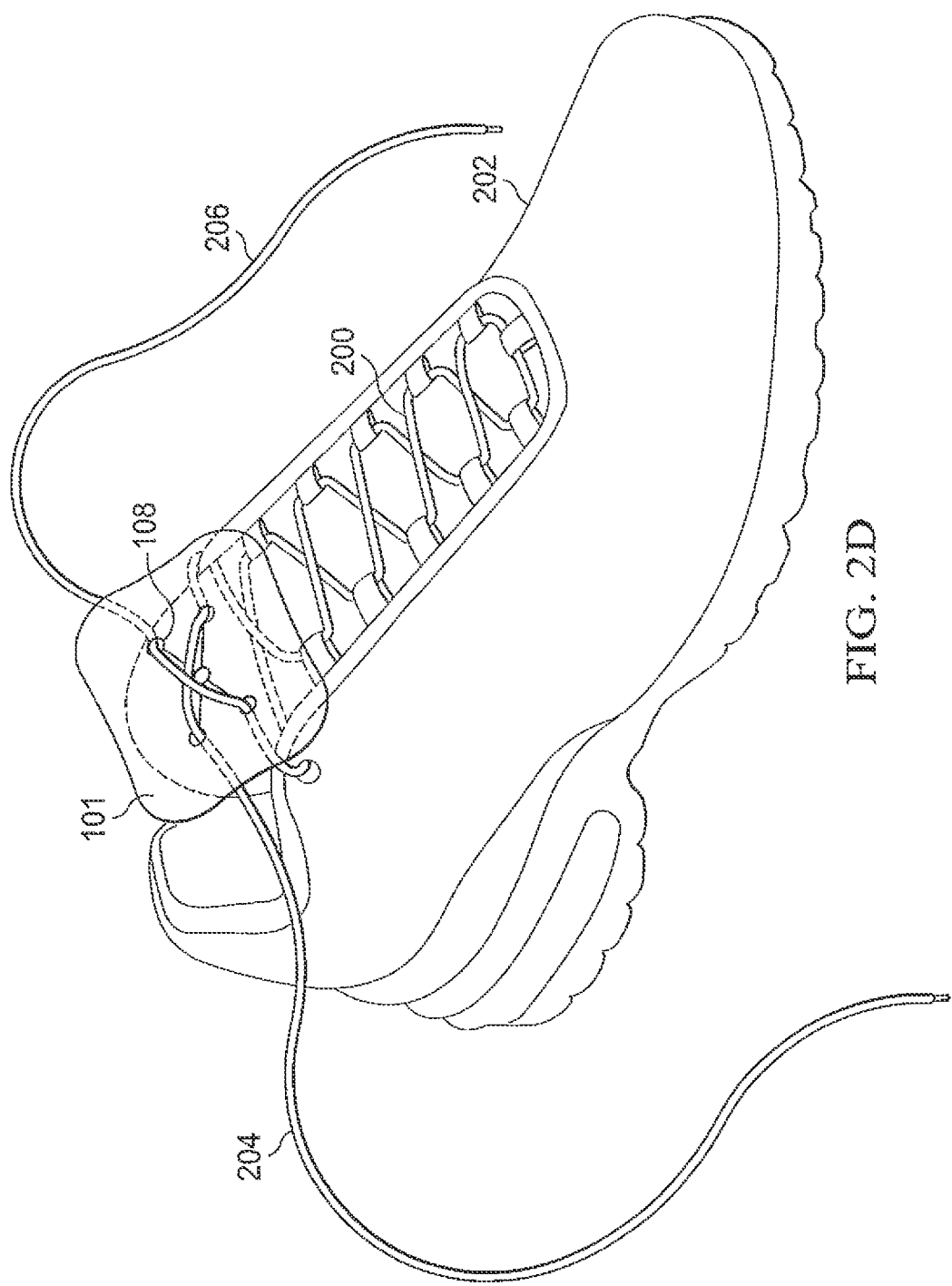

Referring to FIG. 2C, the next step of the method is illustrated. A second end 206 of shoelace 200 is inserted through opening 110 starting at lower face 104, And then second end 206 is inserted through opening 108 starting at upper face 102, as illustrated in FIG. 2D.

Figure 2E:
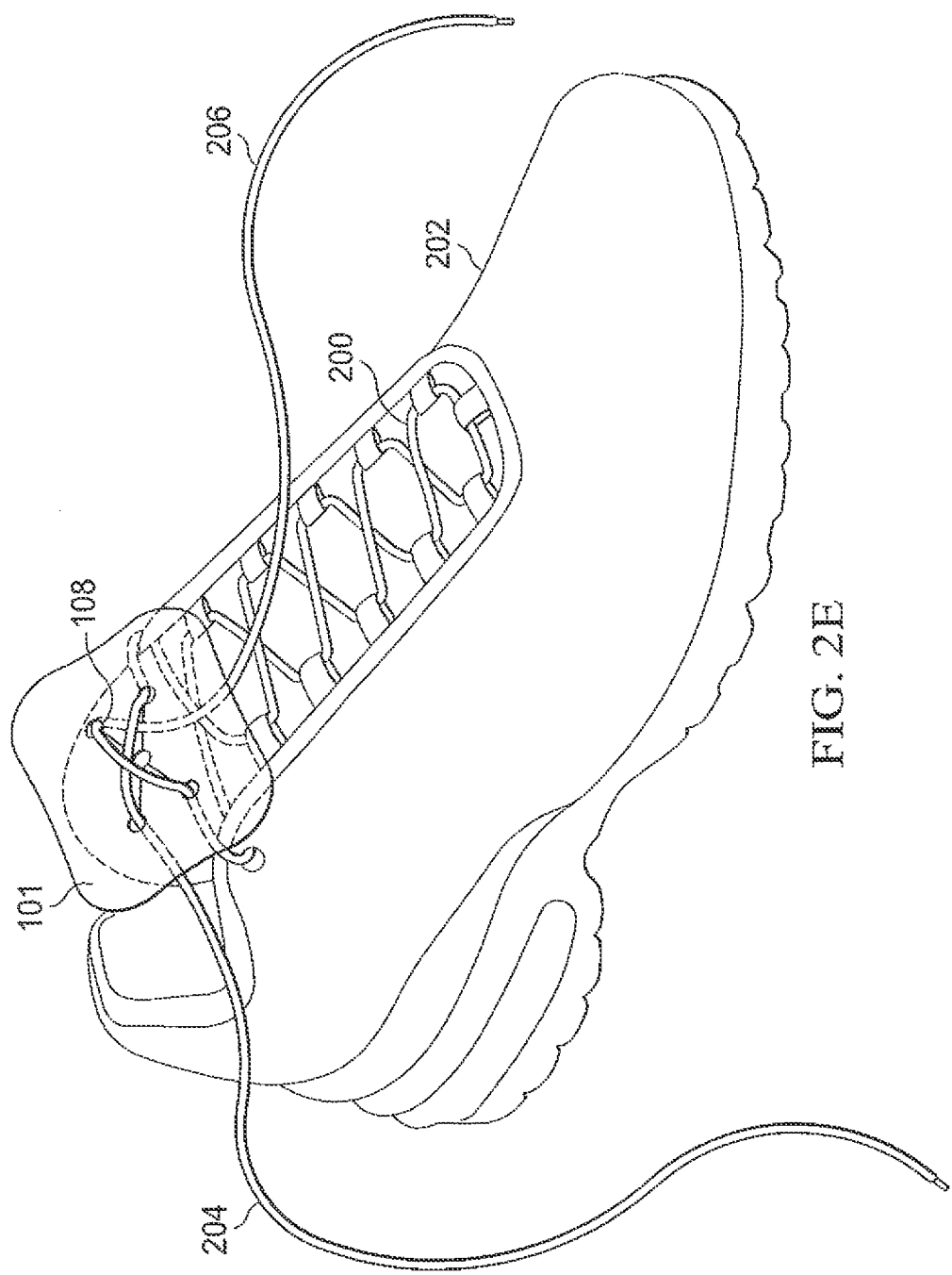
Figure 2F:
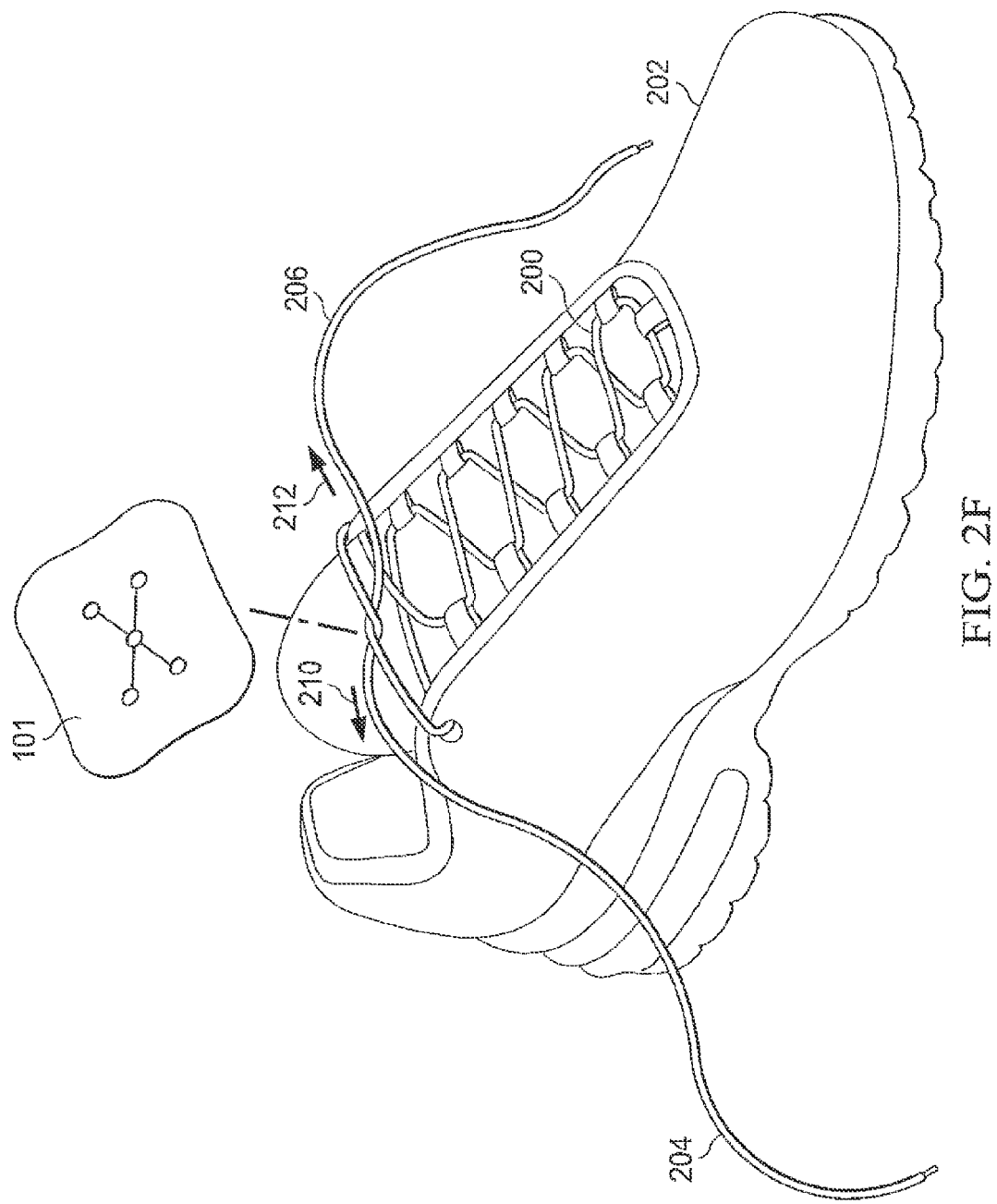

As illustrated in FIG. 2E, the second end 206 of shoelace 200 is then positioned underneath shoelace 200 adjacent first end 204. Referring to FIG. 2F, a force as illustrated by arrow 210 is then applied to first end 204 of shoelace 200, and a force 212 as illustrated by arrow 212 is applied to second end 206 of shoelace 200. When the forces are applied, body member 101 will be released from shoelace 200. This release is possible because of the slits 114 and 116 (and opening 118 if utilized).

Figure 2G:
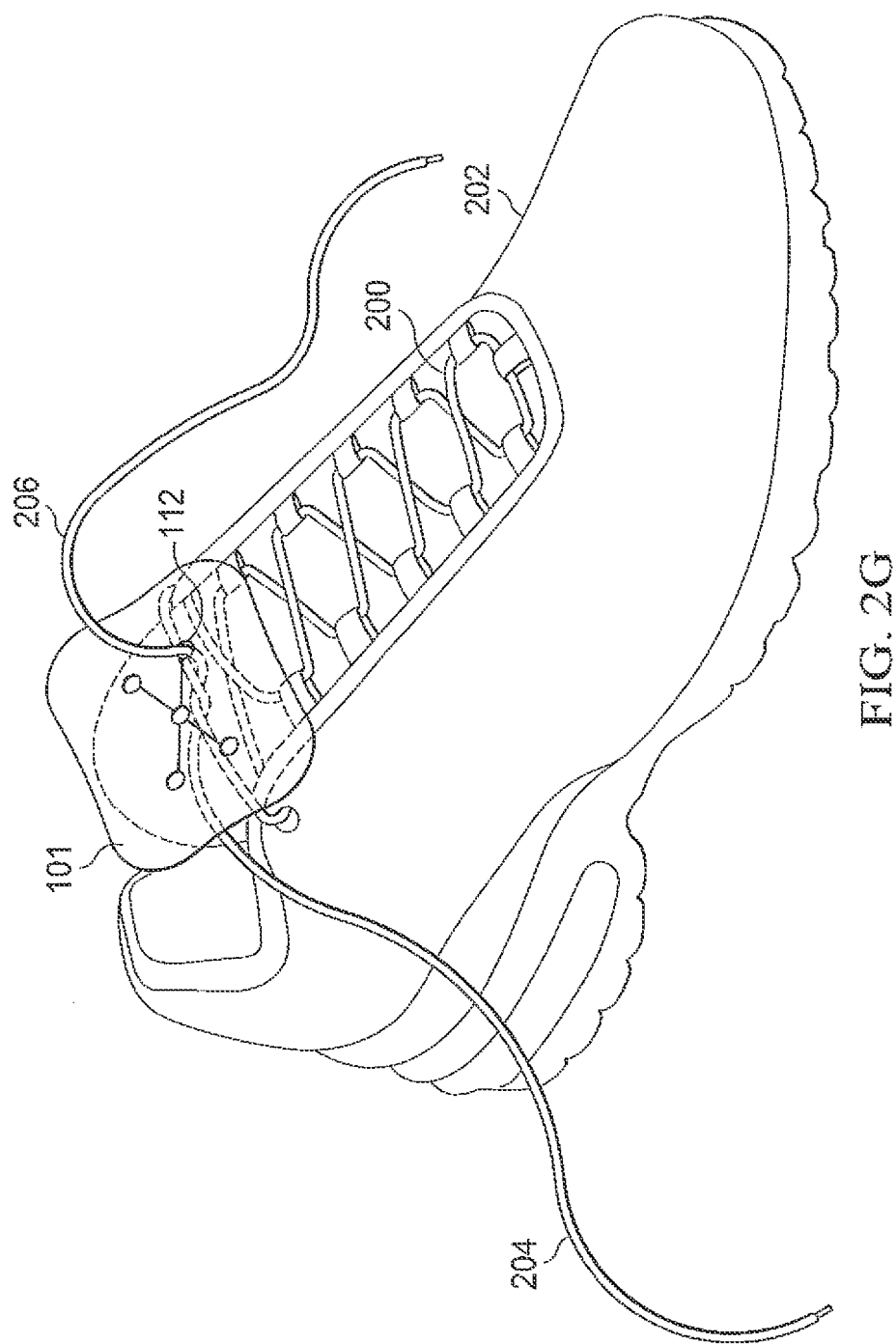
Figure 2H:
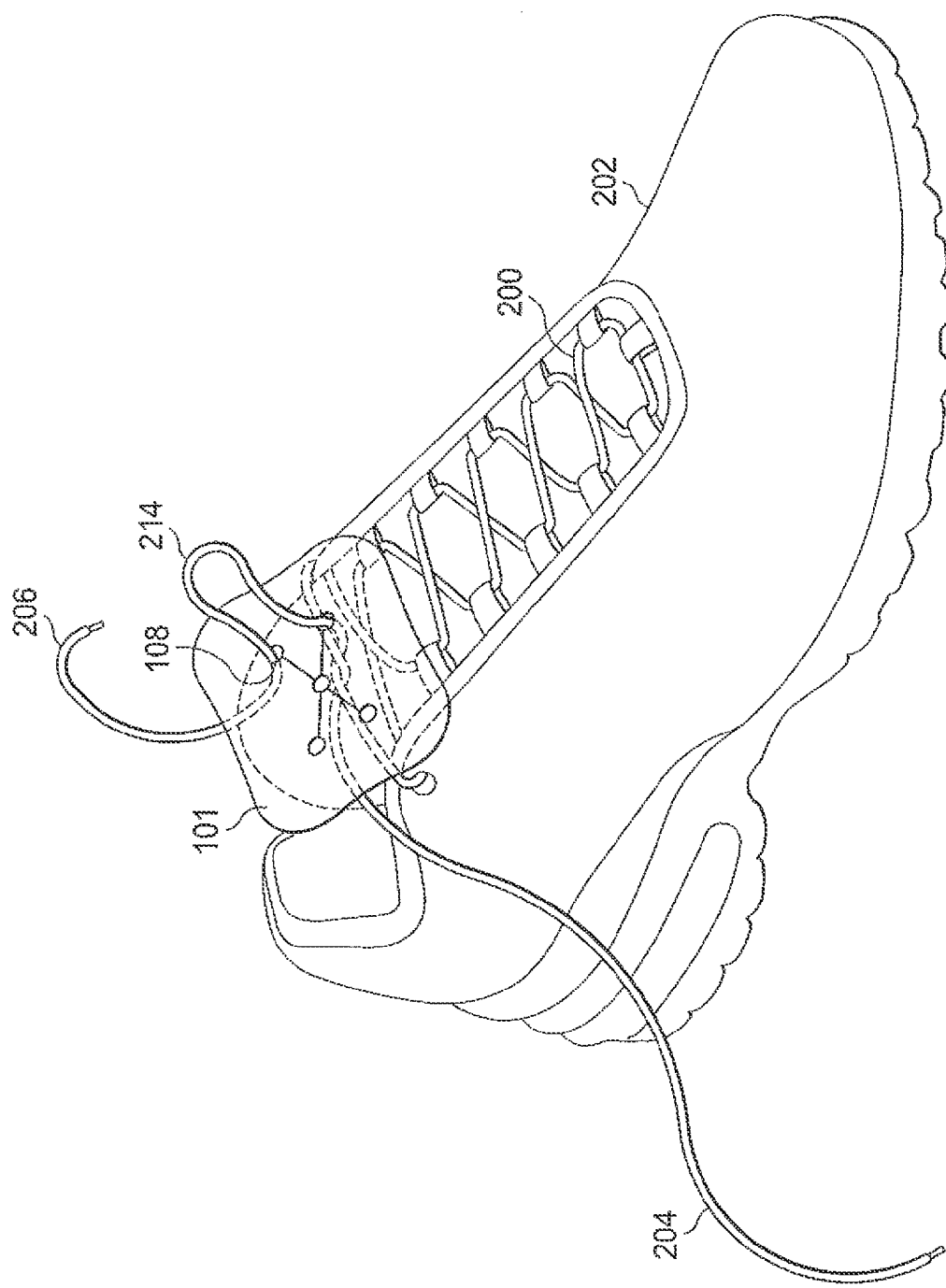
Figure 2I:
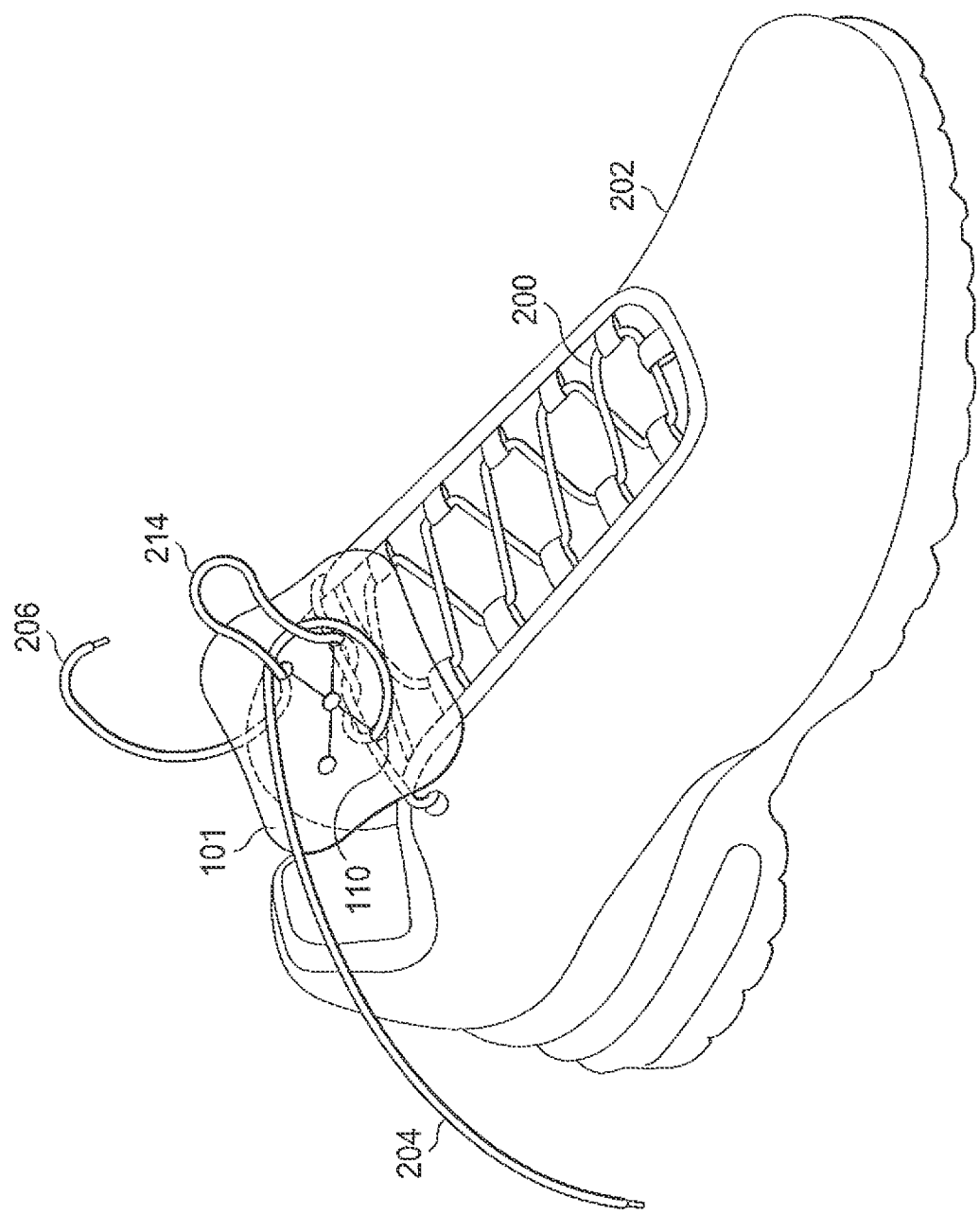

Referring now to FIG. 2G, body member 101 is re-positioned on the upper part of shoe 202 proximate the ends 204, 206 of shoelace 202. Second end 206 of shoelace 200 is inserted through opening 112 starting at lower face 104, and then inserted back through opening 108 starting at upper face 102 (FIG. 2I-1) This will form a loop 214. First end 204 of shoelace 202 is then inserted through opening 110, as illustrated in FIG. 2I, starting at lower face 104 and "looped" around the loop 214 in the counterclockwise direction (although a clockwise direction is also contemplated).

Figure 2J:
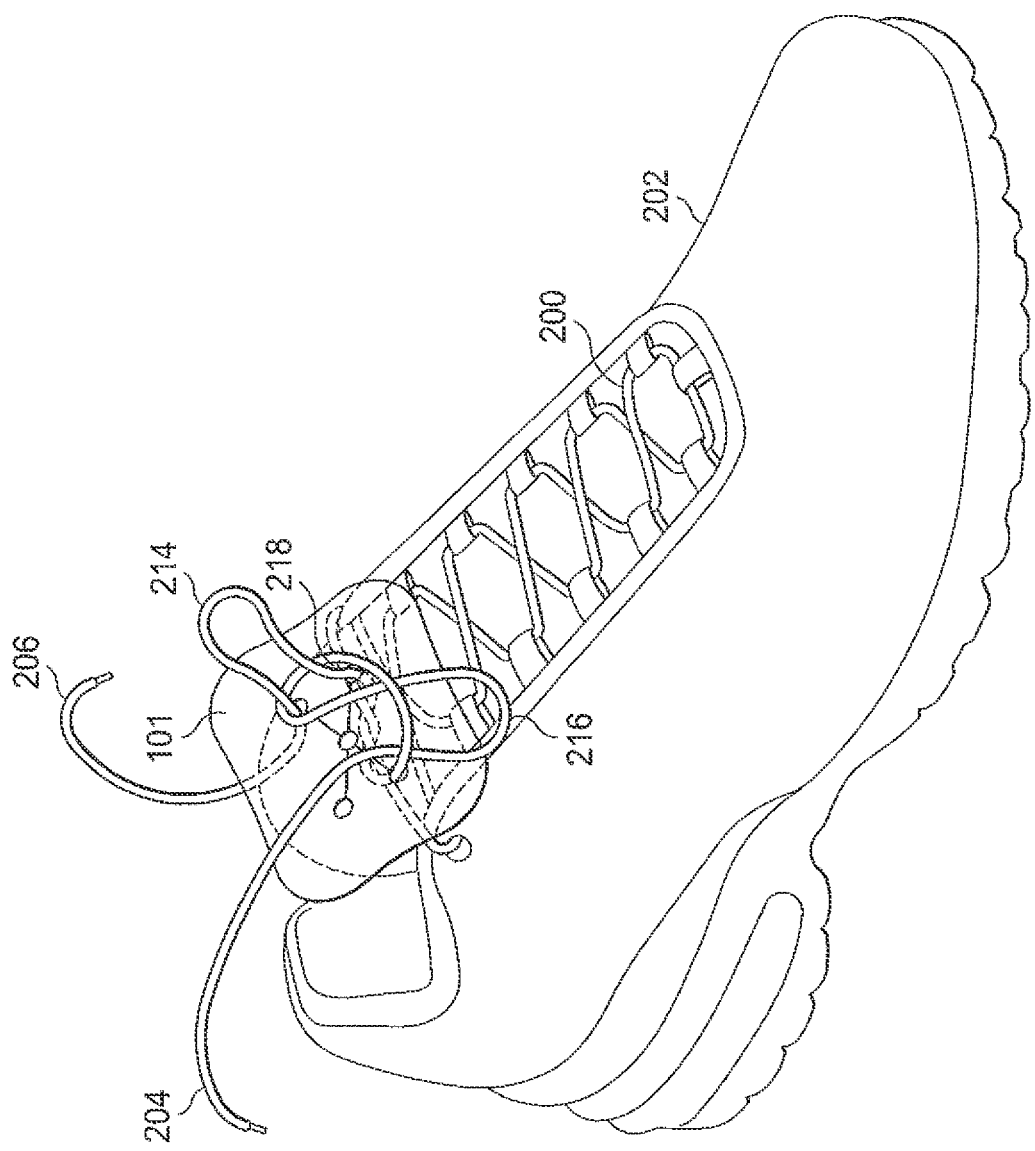
Figure 2K:
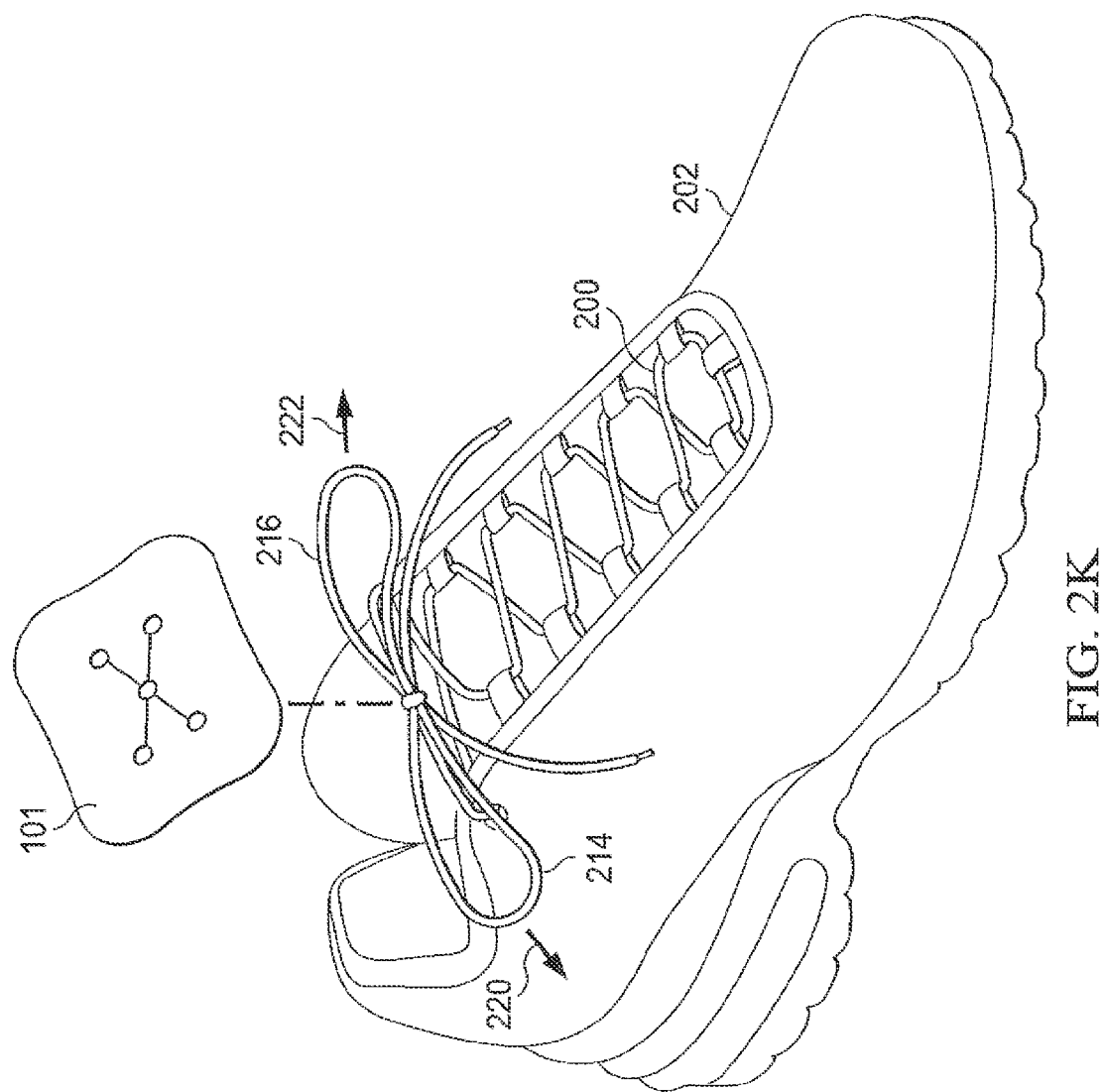

Referring now to FIG. 2J, a loop 216 is formed a short distance away from first end 204 of shoelace 202. This is probably done easiest by a user's thumb. Loop 216 is then inserted back through an opening 218 formed between loop 214 and the portion of first end 204 that was wrapped around loop 214. To finish the tying of shoelace 202, as illustrated in FIG. 2K, a force as illustrated by arrow 220 is applied to loop 214 and a force as illustrated by arrow 222 is applied to loop 216. When the forces are applied, body member 101 may be released from shoelace 200 via slits 114 and 116 automatically, or the user may have to hold the center of the tied knot and apply a gentle pull force to body member 101 to release the body member from shoelace 200.

One skilled in the art will understand that any method steps described herein may be done in an opposite manner. For example, if the method described in FIGS. 2A-2K may be referred to as a "right-handed" shoe tying method, then a "left-handed" shoe tying method is also applicable by "reversing" the steps.

Figure 3:
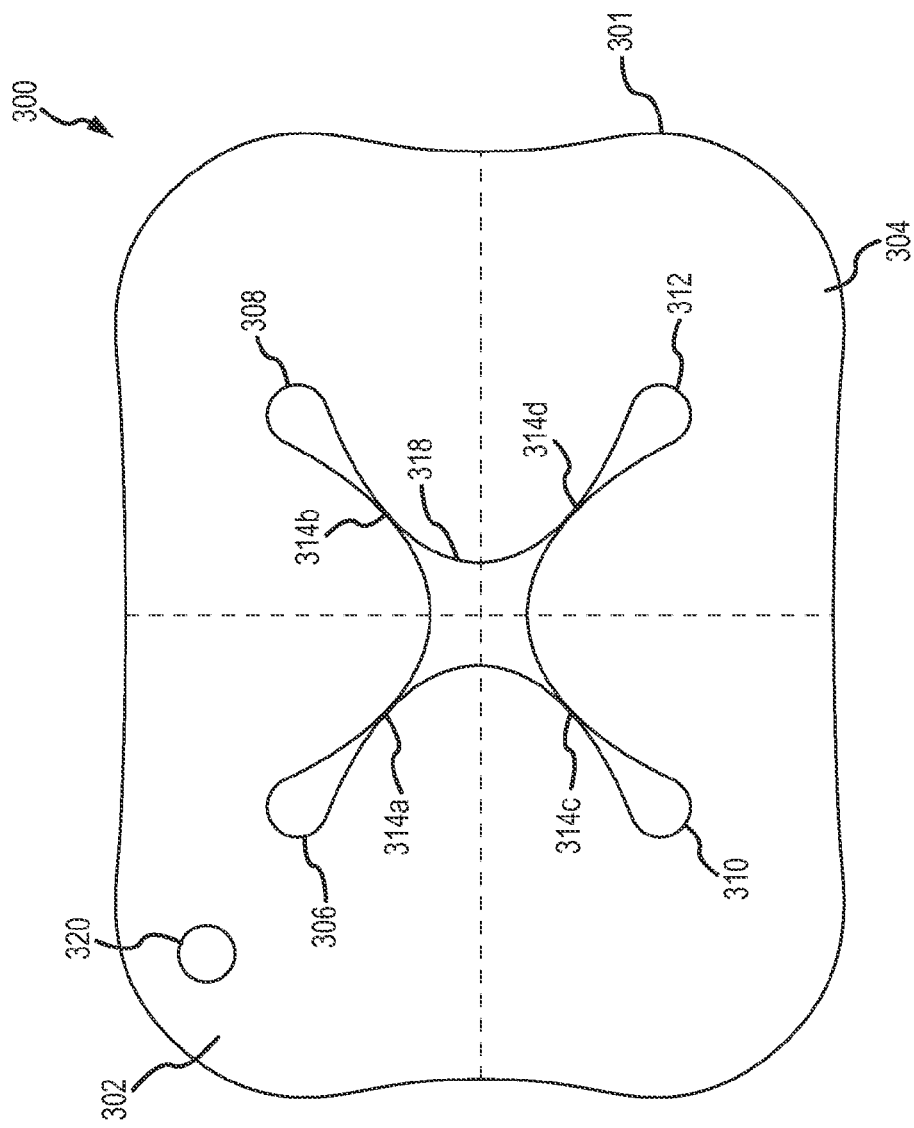
FIG. 3 is a plan view of a shoelace tying device according to another embodiment of the invention.

Referring to FIG. 3, there is disclosed a device 300 according to another embodiment of the invention that will also be found quite useful in the tying of one's shoelace. In the illustrated embodiment, device 300 includes a body member 301 having a substantially planar upper face 302 and a substantially planar lower face 304. Body member 301 also includes a first opening 306, a second opening 308, a third opening 310, and a fourth opening 312. First opening 306, second opening 308, third opening 310, and fourth opening 312 are coupled to an opening 318 at the center of body member 101 by slits 314. Device 300 is otherwise constructed similarly to device 100, with the exception of the change in shape of openings 306, 308, 310, 312, 318, slits 314, and the addition of lanyard hole 320.

Figure 4B:
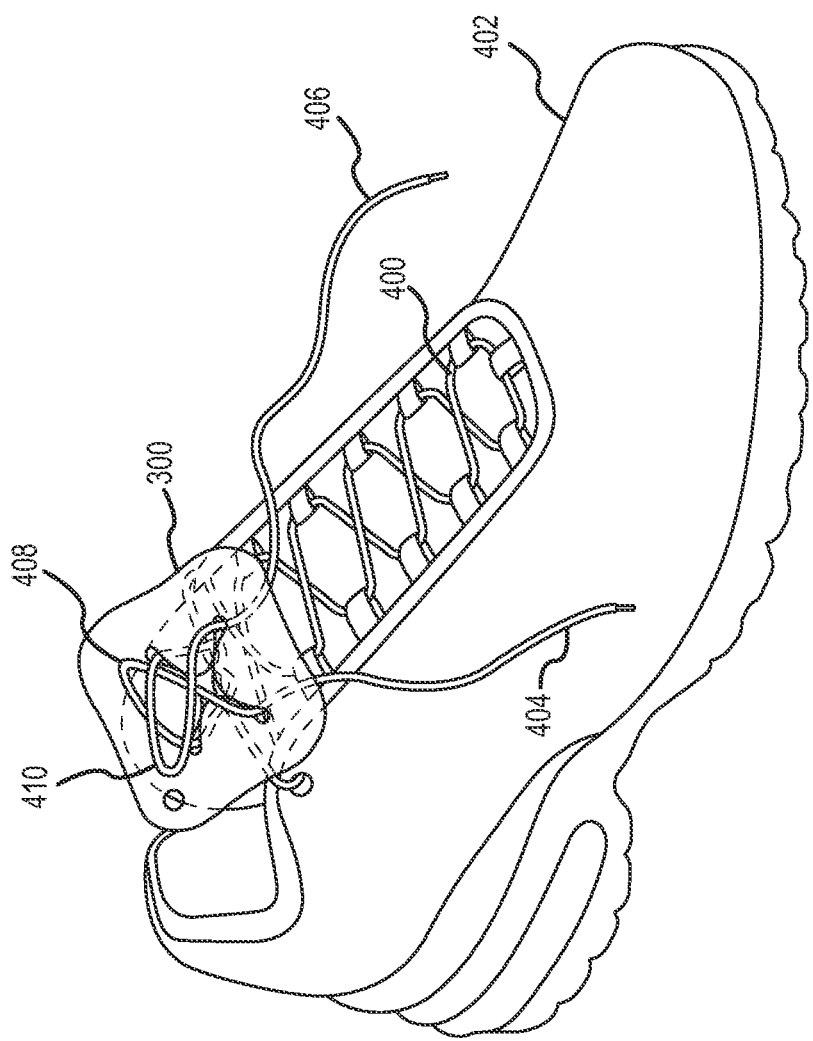

Referring now to FIGS. 4A-4E, a method of using device 100 or device 300 to tie a shoelace 400 according to another embodiment of the invention is illustrated. In FIG. 4A, the steps corresponding to FIGS. 2A-2F have already been completed, either with or without assistance of device 100, 300. In FIG. 4A, device 100, 300 is again applied to the top of the shoe 402 over the existing crossed shoelace 400. First end 404 of shoelace 400 is then inserted into the underside of opening 306, and into the topside of opening 310 as shown to form a first loop 408. Second end 406 of shoelace 400 is then inserted into the underside of opening 308, and into the topside of opening 312 as shown to form a second loop 410.

Figure 4C:
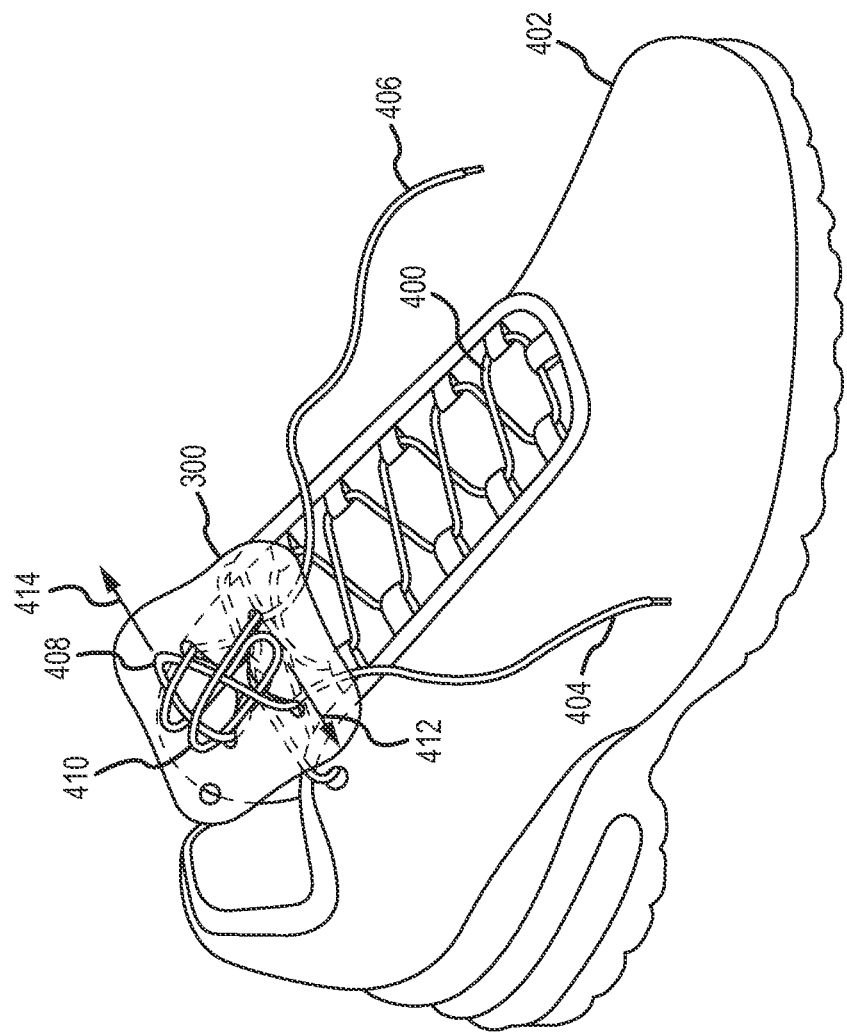
Figure 4E:
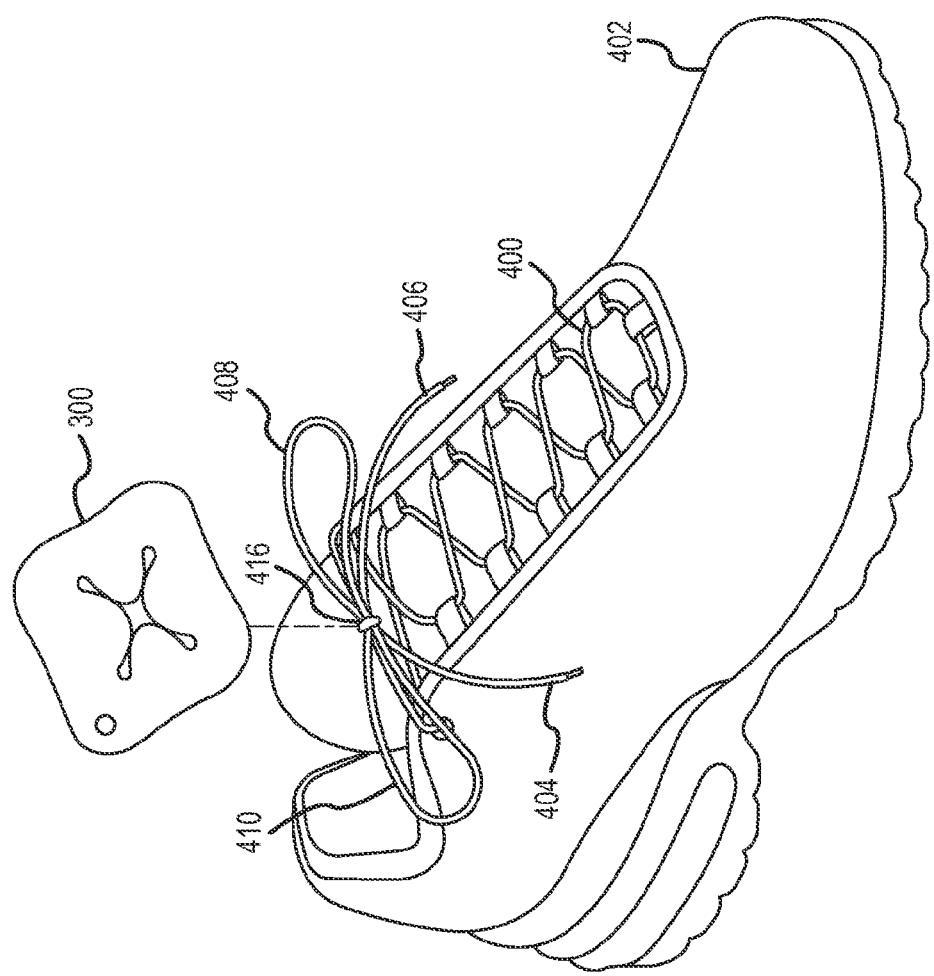

In FIG. 4B, second loop 410 is crossed over first loop 408 as shown. In FIG. 4C, second loop 410 is turned under the crossed loops 408,410. Loops 408, 410 are then pulled in substantially opposite directions as indicated by arrows 412, 414 to create a knot 416 as shown in FIG. 4D. In FIG. 4E, device 100, 300 is pulled upward and away from knot 416 to leave the tied shoelace 400.

While several embodiments of the disclosure have been shown in the FIGURES, it is not intended that the disclosure be limited thereto, as it is intended that the disclosure be as broad in scope as the art will allow and that the specification be read likewise. Therefore, the above description should not be constructed as limiting, but merely as examples of particular embodiments. Those skilled in the art will envision other modifications within the scope and spirit of the claims appended hereto.

What is claimed is:

1. A method for tying a shoelace, wherein the method comprises:
   supporting a shoelace tying device above a shoelace, the shoelace tying device having at least:
      a planar body having a first quadrant, a second quadrant, a third quadrant, and a fourth quadrant;
      a first aperture passing through the planar body in the first quadrant;
      a second aperture passing through the planar body in the second quadrant;
      a third aperture passing through the planar body in the third quadrant;
      a fourth aperture passing through the planar body in the fourth quadrant;
      a fifth aperture passing through the planar body; and
      slits connecting each of the first aperture, the second aperture, the third aperture, and the fourth aperture with the fifth aperture;
   inserting a first end of the shoelace into a bottom of the first aperture and then into a top of the second aperture to form a first loop above the planar body;
   inserting a second end of the shoelace into a bottom of the third aperture and then into a top of the fourth aperture to form a second loop above the planar body;
   crossing the first loop over the second loop;
   moving an end of the first loop under the second loop; and
   pulling the end of the first loop in a direction opposite an end of the second loop to tie the shoelace.

2. The method for tying a shoelace of claim 1, wherein the method further comprises:
   removing the shoelace tying device from the shoelace by lifting the planar body causing at least a portion of the shoelace to pass through the fifth aperture.

3. The method for tying a shoelace of claim 2, wherein removing the shoelace tying device from the shoelace by lifting the planar body further causes:
 at least a portion of the shoelace to pass through at least one slit.

4. The method for tying a shoelace of claim 1, wherein the method further comprises:
 prior to supporting the shoelace tying device above the shoelace, crossing the first end of the shoelace over the second end of the shoelace and passing either the first end or the second end under the shoelace.

5. The method for tying a shoelace of claim 4, wherein crossing the first end of the shoelace over the second end of the shoelace comprises:
 supporting the shoelace tying device above the shoelace;
 inserting the first end of the shoelace through the first aperture and the fourth aperture; and
 inserting the second end of the shoelace through the second aperture and the third aperture.

6. The method for tying a shoelace of claim 5, wherein passing either the first end or the second end under the shoelace comprises:
 passing, under the shoelace tying device, either the first end or the second end under the shoelace.

7. The method for tying a shoelace of claim 6, wherein the method further comprises:
 removing the shoelace tying device from the shoelace by lifting the planar body causing at least a portion of the shoelace to pass through the fifth aperture.

8. The method for tying a shoelace of claim 4, wherein crossing the first end of the shoelace over the second end of the shoelace comprises:
 supporting the shoelace tying device above the shoelace;
 inserting the first end of the shoelace through the second aperture and the third aperture; and
 inserting the second end of the shoelace through the first aperture and the fourth aperture.

9. The method for tying a shoelace of claim 8, wherein passing either the first end or the second end under the shoelace comprises:
 passing, under the shoelace tying device, either the first end or the second end under the shoelace.

10. The method for tying a shoelace of claim 9, wherein the method further comprises:
 removing the shoelace tying device from the shoelace by lifting the planar body causing at least a portion of the shoelace to pass through the fifth aperture.

11. A method for tying a shoelace, wherein the method comprises:
 supporting a shoelace tying device above a shoelace, the shoelace tying device having at least:
  a planar body having a first quadrant, a second quadrant, a third quadrant, and a fourth quadrant;
  a first aperture passing through the planar body in the first quadrant;
  a second aperture passing through the planar body in the second quadrant;
  a third aperture passing through the planar body in the third quadrant;
  a fourth aperture passing through the planar body in the fourth quadrant;
  a fifth aperture passing through the planar body; and
  slits connecting each of the first aperture, the second aperture, the third aperture, and the fourth aperture with the fifth aperture;
 inserting a first end of the shoelace into a bottom of the first aperture and then into a top of the second aperture to form a first loop above the planar body;
 inserting a second end of the shoelace into a bottom of the third aperture and then forming a second loop with the second end of the shoelace around the first loop;
 forming a third loop with the second end of the shoelace; and
 moving an end of the third loop between the second loop and the planar member; and
 pulling an end of the first loop in a direction opposite the end of the third loop to tie the shoelace.

12. The method for tying a shoelace of claim 11, wherein the method further comprises:
 removing the shoelace tying device from the shoelace by lifting the planar body causing at least a portion of the shoelace to pass through the fifth aperture.

13. The method for tying a shoelace of claim 11, wherein the method further comprises:
 prior to supporting the shoelace tying device above the shoelace, crossing the first end of the shoelace over the second end of the shoelace and passing either the first end or the second end under the shoelace.

14. The method for tying a shoelace of claim 13, wherein crossing the first end of the shoelace over the second end of the shoelace comprises:
 supporting the shoelace tying device above the shoelace;
 inserting the first end of the shoelace through the first aperture and the fourth aperture; and
 inserting the second end of the shoelace through the second aperture and the third aperture.

15. The method for tying a shoelace of claim 14, wherein passing either the first end or the second end under the shoelace comprises:
 passing, under the shoelace tying device, either the first end or the second end under the shoelace.

16. The method for tying a shoelace of claim 15, wherein the method further comprises:
 removing the shoelace tying device from the shoelace by lifting the planar body causing at least a portion of the shoelace to pass through the fifth aperture.

17. The method for tying a shoelace of claim 13, wherein crossing the first end of the shoelace over the second end of the shoelace comprises:
 supporting the shoelace tying device above the shoelace;
 inserting the first end of the shoelace through the second aperture and the third aperture; and
 inserting the second end of the shoelace through the first aperture and the fourth aperture.

18. The method for tying a shoelace of claim 17, wherein passing either the first end or the second end under the shoelace comprises:
 passing, under the shoelace tying device, either the first end or the second end under the shoelace.

19. The method for tying a shoelace of claim 18, wherein the method further comprises:
 removing the shoelace tying device from the shoelace by lifting the planar body causing at least a portion of the shoelace to pass through the fifth aperture.

* * * * *